US012618531B2

(12) United States Patent
Takaro et al.

(10) Patent No.: US 12,618,531 B2
(45) Date of Patent: May 5, 2026

(54) AIR TANK INTEGRATED FRONT BOX STRUCTURE

(71) Applicant: Daimler Truck North America, LLC

(72) Inventors: Trevor Takaro, Portland, OR (US); Rajashekar Kalarasaiah, Bangalore (IN); Tejas Amashi, Belagavi (IN); Sushmitha Mallappa Somashekar, Mysuru (IN)

(73) Assignee: Daimler Truck North America LLC, Portland, OR (US)

( * ) Notice: Subject to any disclaimer, the term of this patent is extended or adjusted under 35 U.S.C. 154(b) by 517 days.

(21) Appl. No.: 18/086,916

(22) Filed: Dec. 22, 2022

(65) Prior Publication Data

US 2023/0204161 A1    Jun. 29, 2023

Related U.S. Application Data

(60) Provisional application No. 63/293,895, filed on Dec. 27, 2021.

(51) Int. Cl.
*F17C 13/08*    (2006.01)
*B62D 25/08*    (2006.01)

(52) U.S. Cl.
CPC .......... *F17C 13/084* (2013.01); *B62D 25/085* (2013.01); *F17C 2205/0107* (2013.01); *F17C 2205/013* (2013.01)

(58) Field of Classification Search
CPC ............ F17C 13/084; F17C 2205/0107; F17C 2205/013; B62D 25/085; B60K 15/067; B60K 15/03; B60K 2015/0775; B60K 2015/0344
See application file for complete search history.

(56) References Cited

U.S. PATENT DOCUMENTS

| | | | | | |
|---|---|---|---|---|---|
| 5,593,167 | A | * | 1/1997 | Barnhardt | ................. B60R 3/00 |
| | | | | | 180/68.5 |
| 6,676,163 | B2 | * | 1/2004 | Joitescu | ................. B60K 15/07 |
| | | | | | 280/834 |
| 8,944,469 | B2 | * | 2/2015 | Mulanon | ............... F17C 13/084 |
| | | | | | 280/834 |
| 12,090,839 | B2 | * | 9/2024 | Iijima | .................. B60K 15/067 |
| 12,227,067 | B2 | * | 2/2025 | Sondre | .................. B60K 15/07 |
| 2004/0075034 | A1 | * | 4/2004 | Yokote | .................. F17C 13/084 |
| | | | | | 248/312 |
| 2010/0269919 | A1 | * | 10/2010 | Stopka | ................... F04B 35/06 |
| | | | | | 137/376 |

(Continued)

*Primary Examiner* — Ko H Chan
(74) *Attorney, Agent, or Firm* — ArentFox Schiff LLP

(57) ABSTRACT

Embodiments herein relate to a front box structure for use on an at least partially electrically powered vehicle. The front box utilizes a first pair of air tank mounting brackets and a second pair of air tank mounting brackets as part of a middle structural layer. Each pair of air tank mounting brackets supports an air tank, as well as other structural components of the front box assembly. The middle structural may also include a first brace and a second brace extending between and coupled to the first and second pairs of air tank mounting brackets. The first pair of air tank mounting brackets are adapted to be coupled to a first air tank, and the second pair of air tank mounting brackets are adapted to be coupled to a second air tank that form a part of the middle structural layer.

16 Claims, 6 Drawing Sheets

(56)  References Cited

U.S. PATENT DOCUMENTS

| | | | |
|---|---|---|---|
| 2011/0127263 A1* | 6/2011 | Lee | F17C 13/12 |
| | | | 220/89.2 |
| 2012/0161430 A1* | 6/2012 | Mulanon | F17C 13/084 |
| | | | 280/834 |
| 2018/0003346 A1* | 1/2018 | Chung | B29C 66/532 |
| 2021/0237801 A1* | 8/2021 | Atsumi | B60R 19/34 |
| 2022/0396143 A1* | 12/2022 | Zhang | B60K 15/07 |

* cited by examiner

AIR TANK INTEGRATED FRONT BOX STRUCTURE

CROSS-REFERENCE TO RELATED APPLICATIONS

This application claims priority to U.S. Provisional Application No. 63/293,895 (filed Dec. 27, 2021), entitled Air Tank Integrated Front Box Structure, which is incorporated herein by reference in its entirety.

TECHNICAL FIELD

Aspects herein relate to a front box structure for an electric vehicle.

BACKGROUND

Traditional vehicles, such as semi-trucks, have an internal combustion engine that is generally located at the front of the vehicle. An electric vehicle typically has one or more electric motors that receive power from a battery assembly. The battery assembly and electric motors are supplemented with other necessary components, such as a radiator, other cooling components such as cooling pumps and surge tanks, heating components and air compressor(s) among other things. These components require space, and may be housed in the space typically occupied by the internal combustion engine of traditional vehicles.

There is a need to house the components within a front box of an electric vehicle in a way that efficiently utilizes space, allows for easy installation and that is structurally sound.

BRIEF DESCRIPTION OF THE DRAWINGS

Examples of aspects herein are described in detail below with reference to the attached drawings figures, wherein.

DETAILED DESCRIPTION

Figure 1:
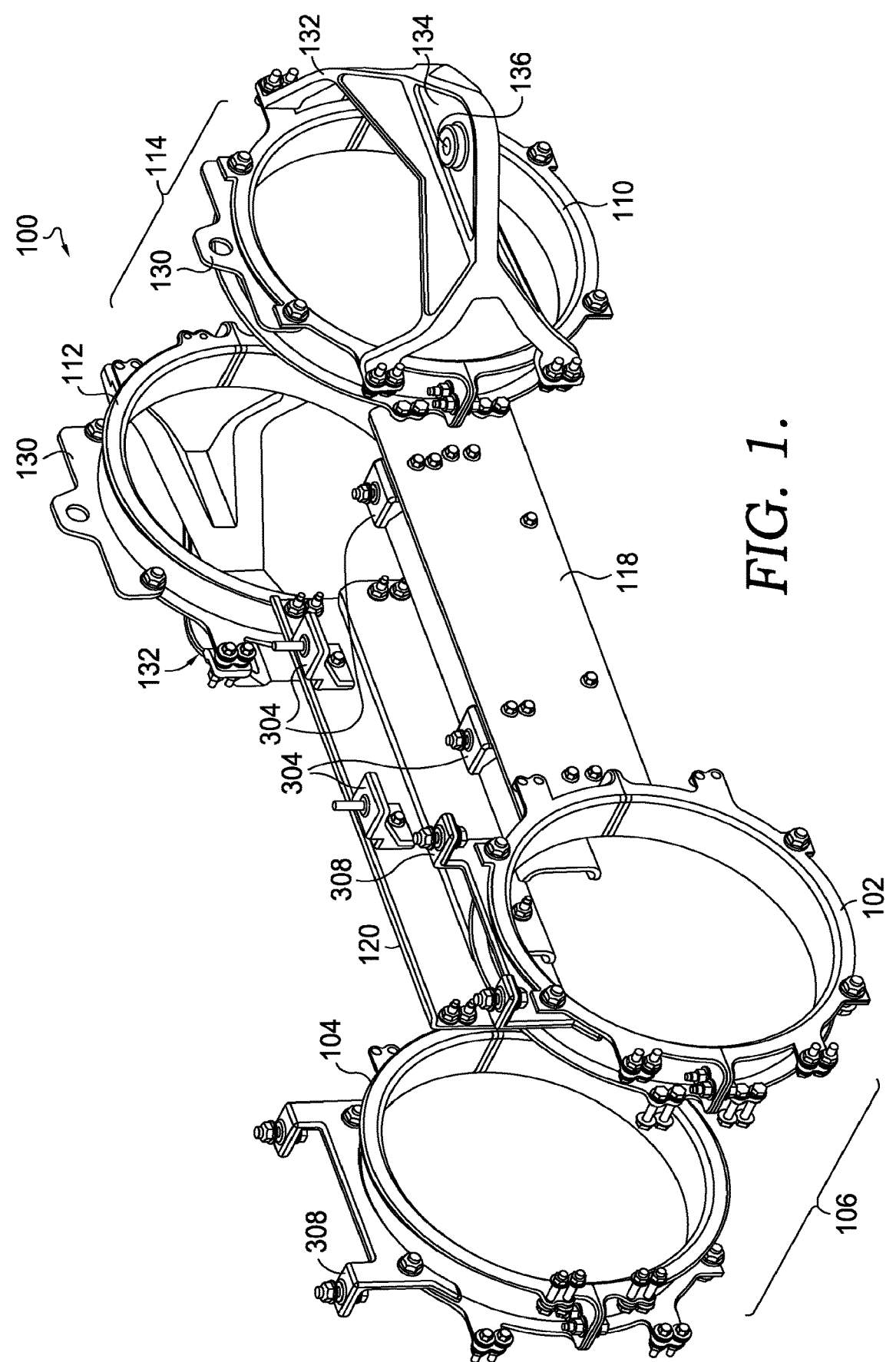
FIG. 1 illustrates a front perspective view of a middle layer of a front box structure in accordance with aspects herein.

The subject matter of the present invention is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to identify different elements of methods employed, the terms should not be interpreted as implying any particular order among or between various steps herein disclosed unless and except when the order of individual steps is explicitly stated.

At a high level, aspects of the present invention relate to a front box structure for use on an at least partially electrically powered vehicle. The front box utilizes a first pair of air tank mounting brackets and a second pair of air tank mounting brackets as part of a middle structural layer. The first pair of air tank mounting brackets are spaced from, and coupled to, the second pair of air tank mounting brackets by a pair of elongated braces. Each pair of tank mounting brackets support an air tank.

In other embodiments, the front box structure comprises at least a middle structural layer. The middle structural layer comprises a first air tank mounting bracket and a second air tank mounting bracket forming a first pair of air tank mounting brackets; and a third air tank mounting bracket and a fourth air tank mounting bracket forming a second pair of air tank mounting brackets spaced from the first pair of air tank mounting brackets. The middle structural layer further comprises a first brace extending between and coupled to the first air tank mounting bracket and the third air tank mounting bracket; and a second brace extending between and coupled to the second air tank mounting bracket and the fourth air tank mounting bracket. The first pair of air tank mounting brackets are adapted to be coupled to a first air tank, and the second pair of air tank mounting brackets are adapted to be coupled to a second air tank.

In some embodiments, the vehicle has a longitudinal vehicle axis extending from the front of the vehicle to the back of the vehicle, and the first pair of air tank mounting brackets are aligned with a first air tank axis that is orthogonal to the longitudinal vehicle axis. In some embodiments, the second pair of air tank mounting brackets are aligned with a second air tank axis that is also orthogonal to the longitudinal vehicle axis and that is parallel to the first air tank axis.

In some embodiments, the front box structure also comprises a lower layer below the middle structural layer and supported by the middle structural layer. In other embodiments, the lower layer of the front box structure includes a first plurality of tray brackets extending from the first pair of air tank mounting brackets and the second pair of air tank mounting brackets; and at least one tray coupled to the first plurality of tray brackets, wherein the tray supports components of the vehicle. The front box structure may also include a second plurality of tray brackets extending from the first brace and the second brace, wherein the at least one tray is coupled to the second plurality of tray brackets.

In further embodiments, the front box structure includes a first support extending upwardly from the first air tank mounting bracket; a second support extending upwardly from the second air tank mounting bracket; and a top layer, wherein at least a first portion of the top layer is supported by the first support and the second support. The front box structure may also include at least a third support extending from the first brace and a fourth support extending from the second brace, wherein the third support and the fourth support provide support for at least a second portion of the top layer.

Figure 2:
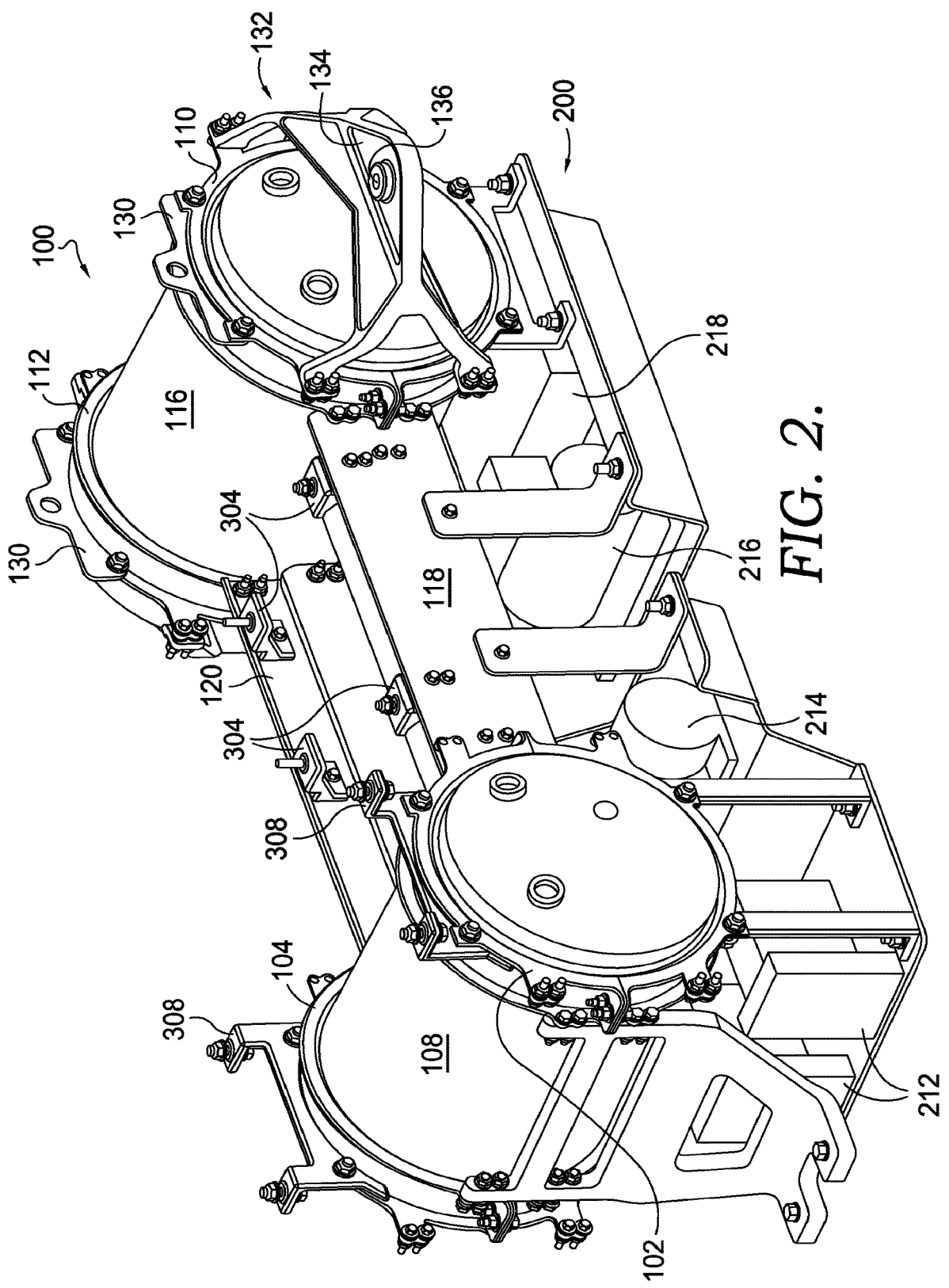
FIG. 2 illustrates a perspective view of a bottom layer added to the middle layer of FIG. 1, in accordance with embodiments herein.

As best seen in FIG. 1, a middle layer 100 of a front box structure is depicted. The middle layer 100 may include a first air tank mounting bracket 102 and a second air tank mounting bracket 104. The first and second air tank mounting brackets 102 and 104 form a first pair of air tank mounting brackets 106. The first and second air tank mounting brackets 102 and 104 may, in some embodiments, be formed of a lightweight, sturdy material, such as steel or aluminum. As shown in FIG. 2, the first pair of air tank mounting brackets 106 support a first air tank 108. Similarly, the middle layer 100 may include a third air tank mounting bracket 110 and a fourth air tank mounting bracket 112. The third and fourth air tank mounting brackets 110 and 112 form a second pair of air tank mounting brackets 114. The third and fourth air tank mounting brackets 110 and 112 may, in some embodiments, be formed of a lightweight, sturdy material, such as steel or aluminum. As shown in FIG. 2, the second pair of air tank mounting brackets 114 support a second air tank 116. Each of the first pair of air tank mounting brackets 106, and each of the second pair of air tank mounting brackets 114 may form a circular frame that matches the cylindrical shape of the corresponding first air tank 108 or second air tank 116. Other frame shapes may be used for the first pair of air tank mounting brackets 106 or the second pair of air tank mounting brackets 114, if the corresponding air tanks 108 and 116 were of a different shape.

As shown in FIG. 1, a first brace 118 is coupled to the first air tank mounting bracket 102 on one end, and is coupled to the third air tank mounting bracket 110 on the other end. The first brace 118 may be made from a lightweight, rigid material, such as steel or aluminum, for example. The first brace 118 may be coupled to the first air tank mounting bracket 102 and the third air tank mounting bracket 110 such as by bolts, rivets, welds or other attachment mechanisms. In some embodiments, the first air tank mounting bracket 102 and the third air tank mounting bracket 110 may include an integral mounting tab to facilitate coupling to the first brace 118.

Similarly, a second brace 120 is coupled to the second air tank mounting bracket 104 on one end, and is coupled to the fourth air tank mounting bracket 112 on the other end, such as by bolts, rivets, welds or other attachment mechanisms. The second brace 120 may also be made from a lightweight, rigid material, such as steel or aluminum, for example. In some embodiments, the second air tank mounting bracket 104 and the fourth air tank mounting bracket 112 may include an integral mounting tab to facilitate coupling to the second brace 120. Together, the first brace 118 and the second brace 120 form a pair of elongated braces extending between, and coupled to, the first pair of air tank mounting brackets 106 and the second pair of air tank mounting brackets 114.

The first pair of air tank mounting brackets 106 and the second pair of air tank mounting brackets 114, along with the first brace 118 and the second brace 120, and the first air tank 108 and the second air tank 116 form a strong core structure for the middle layer 100. The tubular or cylindrical construction of the air tanks (108/116) has been found to give better support in a vertical bending mode, and the hollow large moment of area of the air tanks has been found to provide excellent stiffness in all directions. In addition, the first air tank 108 and the second air tank 116 are efficiently mounted within the front box and do not need to be mounted elsewhere on the vehicle, such as on the rails.

The vehicle on which the middle layer 100 is mounted generally has a longitudinal axis, extending from the front of the vehicle to the rear of the vehicle. When mounted on the vehicle, the middle layer 100 is oriented such that the first brace 118 and the second brace 120 extend along the longitudinal vehicle axis. Additionally, the first pair of air tank mounting brackets 106 are axially aligned and form a first air tank axis that runs through the center of each of the circular frames formed by the first air tank mounting bracket 102 and the second air tank mounting bracket 104. This first air tank axis is orthogonal to the longitudinal vehicle axis. Similarly, the second pair of air tank mounting brackets 114 are axially aligned and form a second air tank axis that runs through each of the circular frames formed by the third air tank mounting bracket 110 and the fourth air tank mounting bracket 112. This second air tank axis is parallel to the first air tank axis and orthogonal to the longitudinal vehicle axis.

Figure 5:
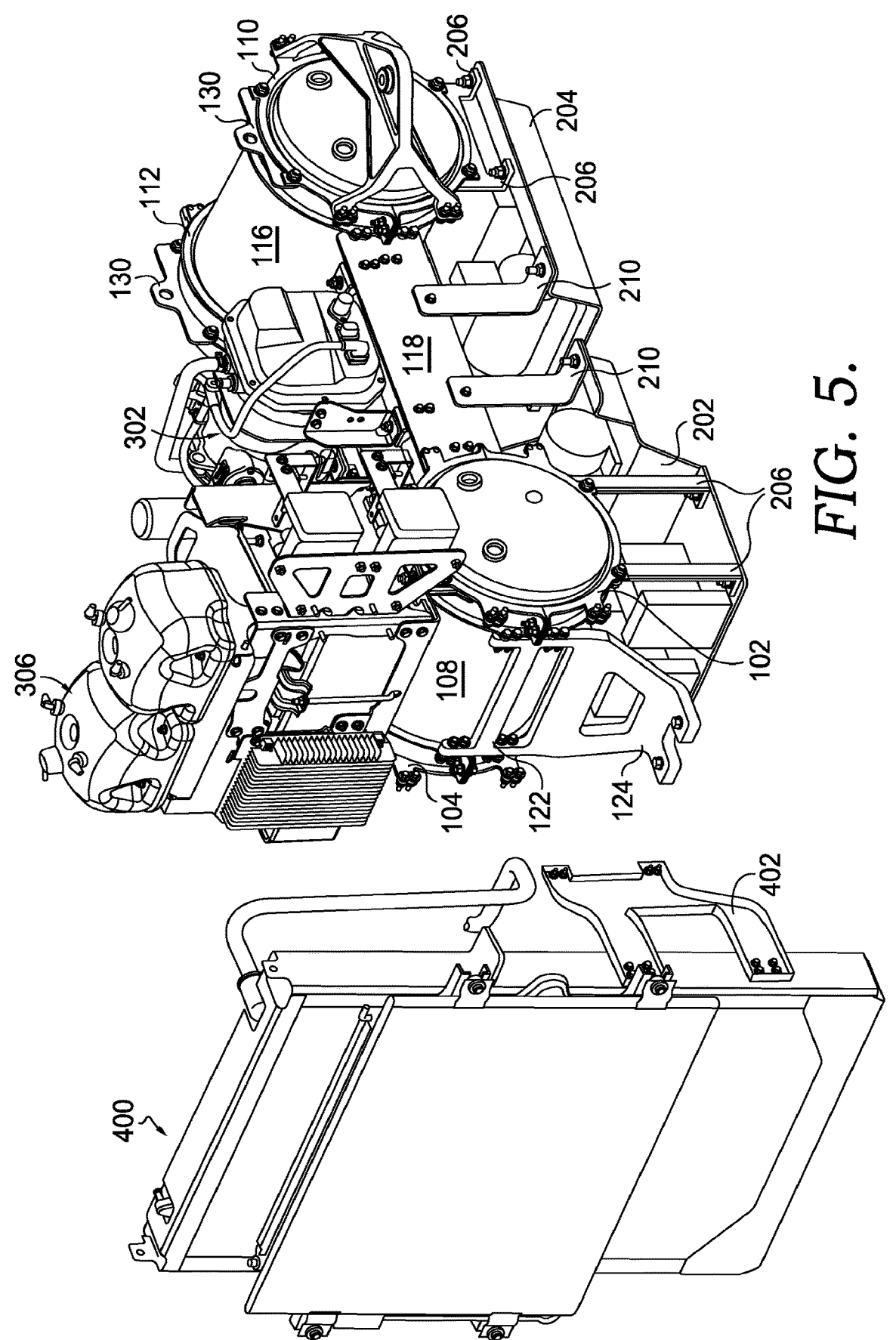
FIG. 5 illustrates a perspective view showing the radiator assembly added to the structure of FIG. 4, in accordance with embodiments herein.

As seen in FIG. 5, the middle layer 100 may also include a front cross-member 122. The upper end of the front cross-member 122 is coupled to, and extends between, the first pair of air tank mounting brackets 106, such as by bolting the front cross-member 122 to a flange on each of the first pair of air tank mounting brackets 106. The lower end of the front cross-member 122 has a forwardly extending flange 124 to facilitate mounting to a frame structure on the vehicle as discussed below with respect to FIG. 6.

Figure 6:
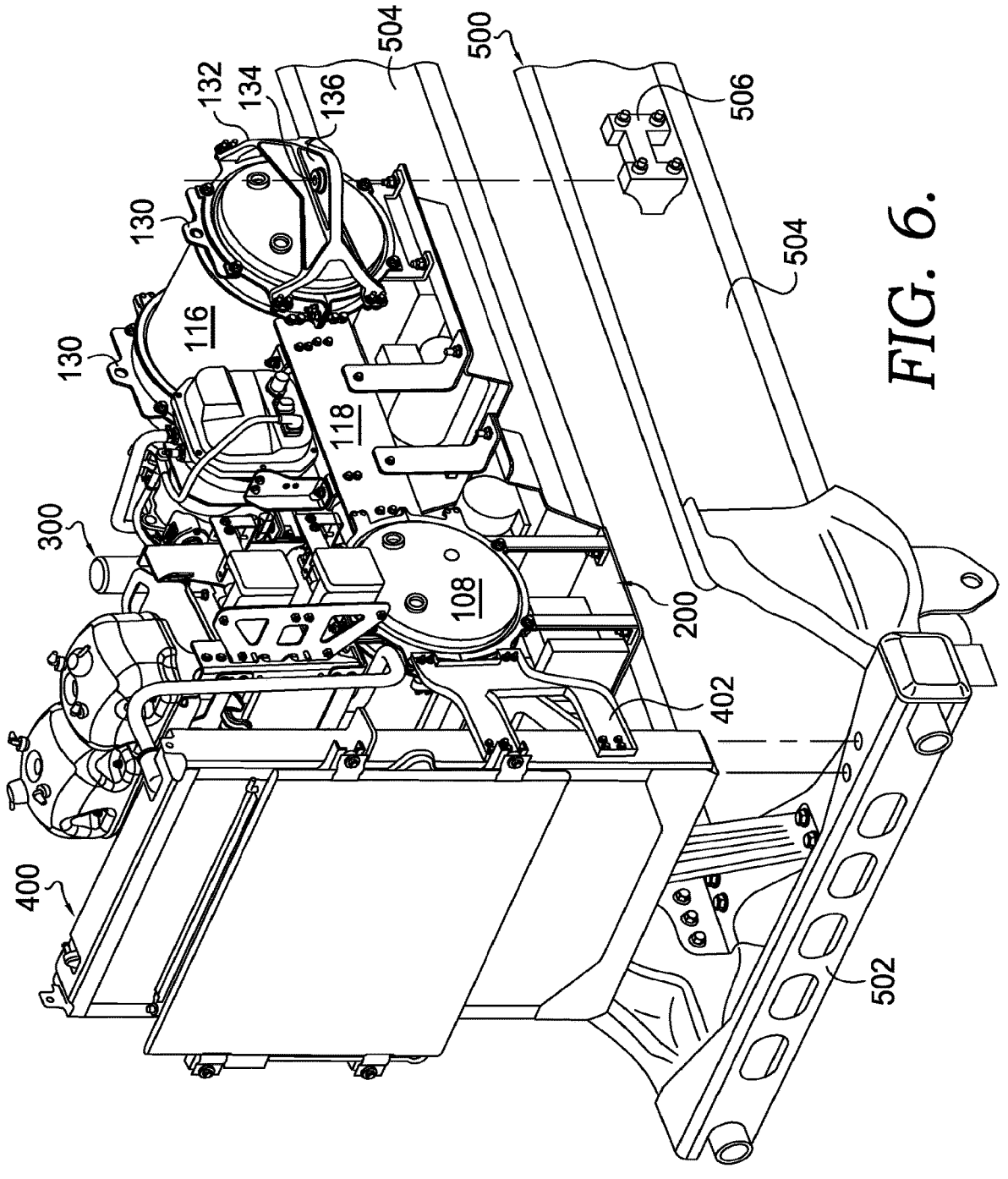
FIG. 6 illustrates a perspective view of the structure of FIG. 5 added to a frame of an electric vehicle, in accordance with embodiments herein.

As best seen in FIGS. 1 and 6, each of the second pair of air tank mounting brackets 114 may have a lifting bracket 130 coupled thereto, and extending upwardly therefrom. In some embodiments, the lifting bracket 130 could be integrally formed with each of the pair of second air tank mounting brackets 114, or the lifting bracket 130 could be attached to each of the pair of second air tank mounting brackets 114, such as by bolting, riveting, welding, or similar attachment mechanisms.

The second pair of air tank mounting brackets 114 may also each have a side casting 132 coupled thereto and extending outwardly therefrom. The side casting 132 may be coupled to a corresponding one of the second pair of air tank mounting brackets 114, such as by bolting, riveting, welding or the like. Each side casting 132 has a mounting surface 134 with a through-hole 136 to facilitate mounting the front box structure to the vehicle, as discussed more fully below with respect to FIG. 6.

As best seen in FIG. 2, the middle layer 100 serves as a support for a lower layer 200. In some embodiments, the lower layer 200 includes a first tray 202 and a second tray 204 that support other components, as is further described below. While shown as two separate pieces, in embodiments herein, the first tray 202 and the second tray 204 are one integrated part. The first tray 202 and the second tray 204 are supported by a number of tray brackets 206 that are coupled to, and extend below, the first pair of air tank mounting brackets 106 and the second pair of air tank mounting brackets 114. In some embodiments, additional support for the first tray 202 and/or the second tray 204 is provided by additional tray brackets 210 that are coupled to, and extend below, the first brace 118 and the second brace 120. The tray brackets 206 and the tray brackets 210 may be coupled to the first pair of air tank mounting brackets 106, the second pair of air tank mounting brackets 114, the first brace 118, the second brace 120, the first tray 202 and the second tray 204 such as by bolting, riveting, welding or other attachment mechanisms. The first tray 202 and the second tray 204 support components of the electric vehicle, such as positive temperature coefficient (PTC) cabin heaters 212, coolant pumps 214, an electric refrigerant compressor (ERC) 216 and/or a DC-DC converter 218.

Figure 3:
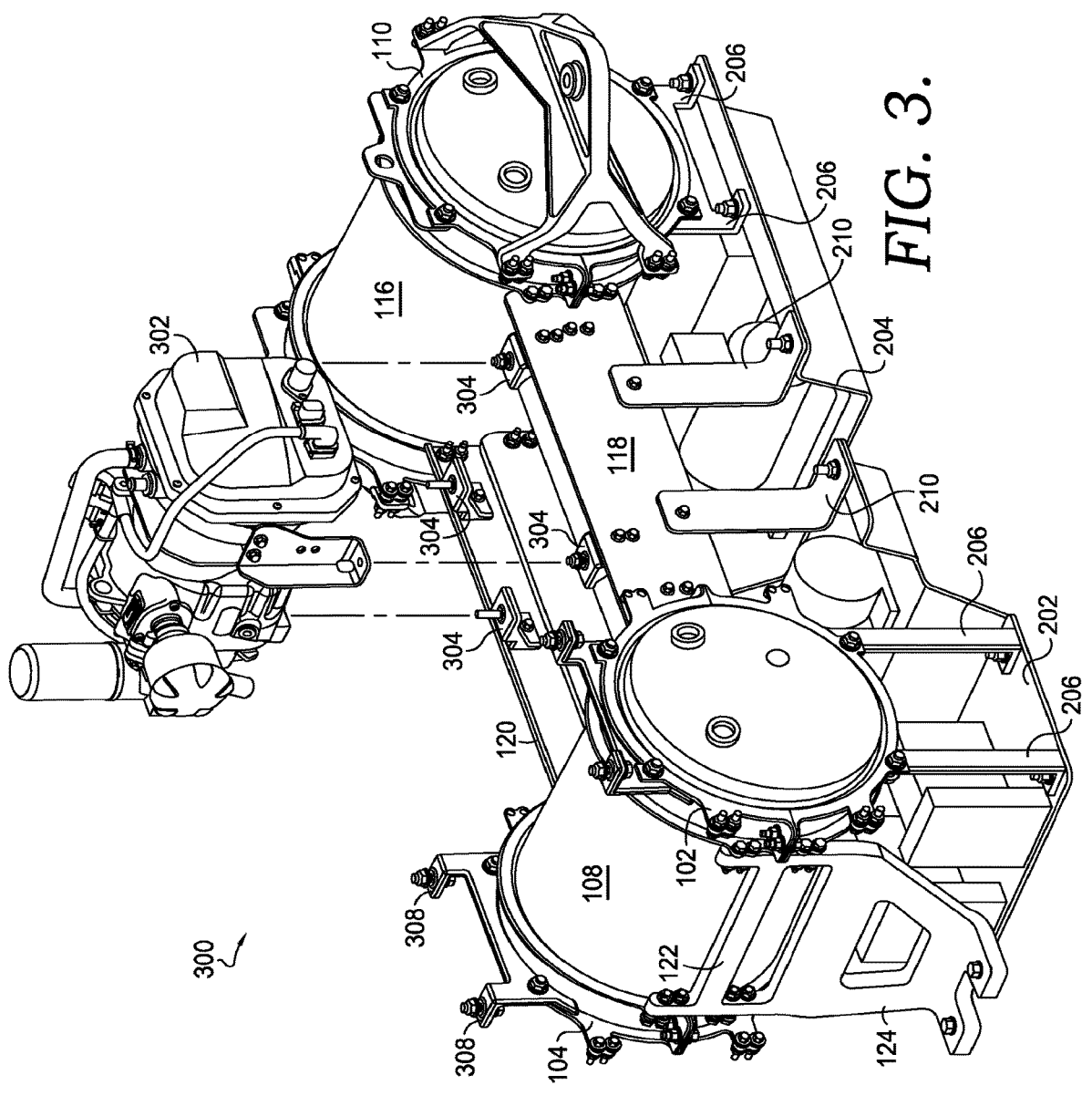
FIG. 3 illustrates a perspective view of the structure of FIG. 2, and adding an air compressor in a top layer, in accordance with embodiments herein.
Figure 4:
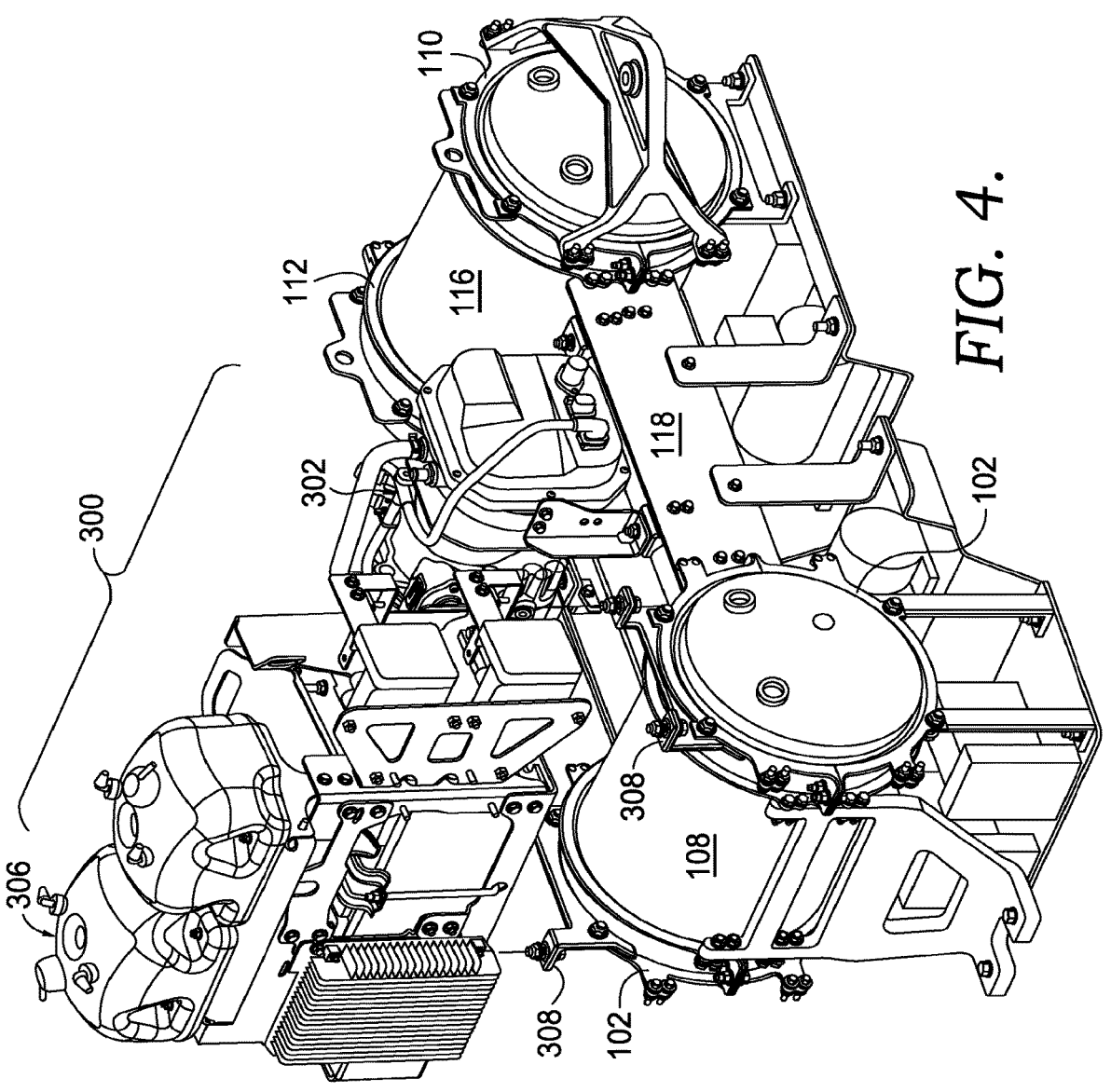
FIG. 4 illustrates a perspective view similar to FIG. 3, but adding additional components in the top layer, in accordance with embodiments herein.

As seen in FIGS. 3 and 4, the middle layer 100 also supports a top layer 300. In some embodiments, the top layer 300 includes an air compressor assembly 302. The air compressor assembly 302 may be mounted to supports 304 that are coupled to, and extend from, the upper ends of the first brace 118 and the second brace 120. In some embodiments, the supports 304 are rigidly coupled to the first brace 118 and the second brace 120 such as by bolting, riveting, welding, or other attachment mechanisms. Similarly, the air compressor assembly 302 may be bolted to the supports 304. As seen in FIG. 4, the top layer 300 may also include a low-voltage (LV) battery and components assembly 306. To facilitate coupling the LV battery and components assembly 306 to the middle layer 100, the first pair of air tank mounting brackets 106 may have supports 308 coupled thereto, and extending upwardly therefrom. In some embodiments, the supports 308 are rigidly coupled to the first pair of air tank mounting brackets, such as by bolting, riveting, welding, or other attachment mechanisms. The LV battery and components assembly 306 may then be attached to the supports 308, such as with bolts or other attachment mechanisms.

As best seen in FIG. 5, the front box structure may also include a radiator assembly 400. In some embodiments, the radiator assembly 400 includes a pair of side brackets 402 (note that in FIG. 5, only one side bracket 402 can be seen, but that a similar side bracket 402 is coupled to the hidden side of the radiator assembly 400). The end of the side bracket 402 opposite the radiator assembly 400 is coupled to, and supported by, the middle layer 100. More specifically, in some embodiments, the side bracket 402 may be bolted (or otherwise coupled) to a corresponding one of the first pair of air tank mounting brackets 106.

FIG. 6 depicts the above-described front box structure being installed on a frame 500 of an at least partially electric vehicle, such as an electrically powered truck. A hoist or other lifting mechanism may be coupled to the front box structure, such as by placing lifting hooks through the holes on the lifting brackets 130. A forward lifting hook may be attached to a more-forward part of the front box structure. The flange 124 of the front cross-member 122 may be coupled to a front closing cross-member 502 of the frame 500. The front closing cross-member 502 is coupled to and extends between a pair of frame rails 504. Rearward of the front closing cross-member 502, the frame 500 may include an isolator casting 506 that is coupled to a corresponding frame rail 504. The isolator casting 506 may extend inwardly from the frame rail 504. The rearward end of the front box structure is coupled to the frame 500 through the isolator castings 506. More specifically, the middle layer 100 may be coupled to the frame 500 by bolting the side castings 132 (using holes 136) to the respective isolator casting 506. The front cross-member 122, along with the two side castings 132 provide a three-point mounting for the front box structure to the frame 500.

The middle layer 100 thus removes the need to mount air tanks directly to the frame rails 504, or otherwise mount the air tanks (such as first air tank 108 and second air tank 116) in an inefficient manner. The middle layer 100 utilizes the first air tank 108 and the second air tank 116 (in conjunction with the first pair of air tank mounting brackets 106 and the second pair of air tank mounting brackets 114) to provide a solid, structural middle layer 100 that efficiently utilizes space in the front box and the efficiently mounts the first air tank 108 and the second air tank 116. By removing the need to mount the first air tank 108 and the second air tank 116 to the frame rails 504, the space formerly occupied on the frame rails by the air tanks can be utilized to store other components of the vehicle. In some embodiments, this space can be used to increase the number of cells of a high-voltage battery assembly (thereby increasing the capacity and range of the electric vehicle). Moreover, as discussed above, the first pair of air tank mounting brackets 106 and the second pair of air tank mounting brackets 114 serve not only to secure the corresponding first air tank 108 or second air tank 114, but also serve to support other components of the lower layer 200 and the top layer 300. Additionally, as can be seen by comparing the figures described above, the structure of the middle layer 100 allows a sub-assembly of the air tanks to be completed earlier in manufacturing, allowing quicker installation of the front box structure in the electric vehicle.

The following clauses represent example embodiments of concepts contemplated herein. Any one of the following clauses may be combined in a multiple dependent manner to depend from one or more other clauses. Further, any combination of dependent clauses (clauses that explicitly depend from a previous clause) may be combined while staying within the scope of embodiments contemplated herein. The following clauses are illustrative in nature and are not limiting.

Clause 1. A front box structure for use on an at least partially electrically powered vehicle, the front box structure comprising: at least a middle structural layer, the middle structural layer comprising; a first air tank mounting bracket and a second air tank mounting bracket forming a first pair of air tank mounting brackets; a third air tank mounting bracket and a fourth air tank mounting bracket forming a second pair of air tank mounting brackets spaced from the first pair of air tank mounting brackets; a first brace extending between and coupled to the first air tank mounting bracket and the third air tank mounting bracket; and a second brace extending between and coupled to the second air tank mounting bracket and the fourth air tank mounting bracket, wherein the first pair of air tank mounting brackets are adapted to be coupled to a first air tank, and the second pair of air tank mounting brackets are adapted to be coupled to a second air tank.

Clause 2. The front box structure of clause 1, wherein the vehicle has a longitudinal vehicle axis extending from the front of the vehicle to the back of the vehicle, and wherein the first pair of air tank mounting brackets are aligned with a first air tank axis orthogonal to the longitudinal vehicle axis.

Clause 3. The front box structure of any of clauses 1-2, wherein the second pair of air tank brackets are aligned with a second air tank axis orthogonal to the longitudinal vehicle axis and parallel to the first air tank axis.

Clause 4. The front box structure of any of clauses 1-3, further comprising a lower layer below the middle structural layer and supported by the middle structural layer.

Clause 5. The front box structure of any of clauses 1-4, further comprising a first plurality of tray brackets extending from the first pair of air tank mounting brackets and the second pair of air tank mounting brackets; and at least one tray coupled to the first plurality of tray brackets, wherein the at least one tray supports components of the vehicle.

Clause 6. The front box structure of any of clauses 1-5, further comprising a second plurality of tray brackets extending from the first brace and the second brace, wherein the at least one tray is coupled to the second plurality of tray brackets Clause 7. The front box structure of any of clauses 1-6, further comprising a first support extending upwardly from the first air tank mounting bracket; a second support extending upwardly from the second air tank mounting bracket; and a top layer, wherein at least a first portion of the top layer is supported by the first support and the second support.

Clause 8. The front box structure of any of clauses 1-7, at least a third support extending from the first brace and a

| fourth support extending from the second brace, wherein the third support and the fourth support are coupled to at least a second portion of the top layer.

Clause 9. A front box structure on an at least partially electrically powered vehicle, the front box structure comprising a first air tank mounting bracket and a second air tank mounting bracket forming a first pair of air tank mounting brackets; a first air tank coupled to and between the first pair of air tank mounting brackets; a third air tank mounting bracket and a fourth air tank mounting bracket forming a second pair of air tank mounting brackets spaced from the first pair of air tank mounting brackets; a second air tank coupled to and between the second pair of air tank mounting brackets; a first brace extending between and coupled to the first air tank mounting bracket and the third air tank mounting bracket; and a second brace extending between and coupled to the second air tank mounting bracket and the fourth air tank mounting bracket.

Clause 10. The front box structure of clause 9, wherein each of the first pair of air tank mounting brackets has at least one tray bracket coupled thereto, and extending downwardly therefrom, wherein the front box structure further comprises a first lower tray coupled to the tray brackets extending from the first pair of air tank mounting brackets.

Clause 11. The front box structure of any of clauses 9-10, wherein each of the second pair of air tank mounting brackets has at least one tray bracket coupled thereto, and extending downwardly therefrom, wherein the front box structure further comprises a second lower tray coupled to the tray brackets extending from the second pair of air tank mounting brackets.

Clause 12. The front box structure of any of clauses 9-11, further comprising at least one tray bracket coupled to and extending downwardly from each of the first brace and the second brace, wherein at least one of the first lower tray and the second lower tray are further coupled to and supported by the tray brackets coupled to the first brace and the second brace.

Clause 13. The front box structure of any of clauses 9-12, wherein each of the second pair of air tank mounting brackets includes a lifting bracket extending upwardly therefrom.

Clause 14. The front box structure of any of clauses 9-13, further comprising a front cross member coupled to, and extending between, the first pair of air tank mounting brackets, the front cross member having a flange extending below and forwardly of the first pair of air tank mounting brackets.

Clause 15. A support structure for a front box of an at least partially electric vehicle, comprising: a first pair of axially aligned air tank mounting brackets; a second pair of axially aligned air tank mounting brackets; and a pair of elongated braces coupled to and extending between the first pair of air tank mounting brackets and the second pair of air tank mounting brackets.

Clause 16. The support structure of clause 15, further comprising: a first air tank coupled to and extending between the first pair of air tank mounting brackets; and a second air tank coupled to and extending between the second pair of air tank mounting brackets; wherein the first air tank and the second air tank form a portion of the structural member.

Clause 17. The support structure of any of clauses 15-16, further comprising a first plurality of supports extending upwardly from the first pair of air tank mounting brackets and a top layer coupled to the first plurality of supports and extending above the first pair of air tank mounting brackets.

Clause 18. The support structure of any of clauses 15-17, further comprising a second plurality of supports extending upwardly from the pair of elongated braces, wherein at least a portion of the top layer is coupled to the second plurality of supports.

Clause 19. The support structure of any of clauses 15-18, further comprising a side casting extending outwardly from each of the second pair of air tank mounting brackets in a direction aligned with the axis of the second pair of air tank mounting brackets.

Clause 20. The support structure of any of clauses 15-19, further comprising a lower layer extending below the first pair of air tank mounting brackets and the second pair of air tank mounting brackets, the lower layer being coupled to and supported by at least one of the first pair of air tank mounting brackets and the second pair of air tank mounting brackets.

Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

What is claimed is:

1. A front box structure for use on an at least partially electrically powered vehicle, the front box structure comprising:
  at least a middle structural layer, the middle structural layer comprising:
  a first air tank mounting bracket and a second air tank mounting bracket forming a first pair of air tank mounting brackets;
  a third air tank mounting bracket and a fourth air tank mounting bracket forming a second pair of air tank mounting brackets spaced from the first pair of air tank mounting brackets;
  a first brace extending between and coupled to the first air tank mounting bracket and the third air tank mounting bracket;
  a second brace extending between and coupled to the second air tank mounting bracket and the fourth air tank mounting bracket,
  a first support extending upwardly from the first air tank mounting bracket;
  a second support extending upwardly from the second air tank mounting bracket; and
  a top layer, wherein at least a first portion of the top layer is supported by the first support and the second support;
  wherein the first pair of air tank mounting brackets are adapted to be coupled to a first air tank, and the second pair of air tank mounting brackets are adapted to be coupled to a second air tank.

2. The front box structure of claim 1, wherein the vehicle has a longitudinal vehicle axis extending from a front of the vehicle to a back of the vehicle, and wherein the first pair of air tank mounting brackets are aligned with a first air tank axis orthogonal to the longitudinal vehicle axis.

3. The front box structure of claim 2, wherein the second pair of air tank brackets are aligned with a second air tank axis orthogonal to the longitudinal vehicle axis and parallel to the first air tank axis.

4. The front box structure of claim 1, further comprising a lower layer below the middle structural layer and supported by the middle structural layer.

5. The front box structure of claim 1, further comprising:
   a first plurality of tray brackets extending from the first pair of air tank mounting brackets and the second pair of air tank mounting brackets; and
   at least one tray coupled to the first plurality of tray brackets, wherein the at least one tray supports components of the vehicle.

6. The front box structure of claim 5, further comprising a second plurality of tray brackets extending from the first brace and the second brace, wherein the at least one tray is coupled to the second plurality of tray brackets.

7. The front box structure of claim 1, further comprising at least a third support extending from the first brace and a fourth support extending from the second brace, wherein the third support and the fourth support are coupled to at least a second portion of the top layer.

8. A front box structure on an at least partially electrically powered vehicle, the front box structure comprising:
   a first air tank mounting bracket and a second air tank mounting bracket forming a first pair of air tank mounting brackets;
   a first air tank coupled to and between the first pair of air tank mounting brackets;
   a third air tank mounting bracket and a fourth air tank mounting bracket forming a second pair of air tank mounting brackets spaced from the first pair of air tank mounting brackets;
   a second air tank coupled to and between the second pair of air tank mounting brackets;
   a first brace extending between and coupled to the first air tank mounting bracket and the third air tank mounting bracket; and
   a second brace extending between and coupled to the second air tank mounting bracket and the fourth air tank mounting bracket;
   wherein each of the first pair of air tank mounting brackets has at least one tray bracket coupled thereto, and extending downwardly therefrom, wherein the front box structure further comprises a first lower tray coupled to the at least one tray bracket extending from the first pair of air tank mounting brackets.

9. The front box structure of claim 8, wherein each of the second pair of air tank mounting brackets has at least one tray bracket coupled thereto, and extending downwardly therefrom, wherein the front box structure further comprises a second lower tray coupled to the at least one tray bracket extending from the second pair of air tank mounting brackets.

10. The front box structure of claim 9, further comprising at least one tray bracket coupled to and extending downwardly from each of the first brace and the second brace, wherein at least one of the first lower tray and the second lower tray are further coupled to and supported by the at least one tray bracket coupled to the first brace and the second brace.

11. The front box structure of claim 8, wherein each of the second pair of air tank mounting brackets includes a lifting bracket extending upwardly therefrom.

12. The front box structure of claim 8, further comprising a front cross member coupled to, and extending between, the first pair of air tank mounting brackets, the front cross member having a flange extending below and forwardly of the first pair of air tank mounting brackets.

13. A support structure for a front box of an at least partially electric vehicle, comprising:
   a first pair of axially aligned air tank mounting brackets;
   a second pair of axially aligned air tank mounting brackets;
   a pair of elongated braces coupled to and extending between the first pair of air tank mounting brackets and the second pair of air tank mounting brackets;
   a first plurality of supports extending upwardly from the first pair of air tank mounting brackets;
   a second plurality of supports extending upwardly from the pair of elongated braces, wherein at least a portion of a top layer is coupled to the second plurality of supports; and
   the top layer coupled to the first plurality of supports and extending above the first pair of air tank mounting brackets.

14. The support structure of claim 13, further comprising:
   a first air tank coupled to and extending between the first pair of air tank mounting brackets; and
   a second air tank coupled to and extending between the second pair of air tank mounting brackets;
   wherein the first air tank and the second air tank form a portion of a structural member.

15. The support structure of claim 13, further comprising a side casting extending outwardly from each of the second pair of air tank mounting brackets in a direction aligned with an axis of the second pair of air tank mounting brackets.

16. The support structure of claim 13, further comprising a lower layer extending below the first pair of air tank mounting brackets and the second pair of air tank mounting brackets, the lower layer being coupled to and supported by at least one of the first pair of air tank mounting brackets and the second pair of air tank mounting brackets.

* * * * *